(12) United States Patent
Talai et al.

(10) Patent No.: US 11,668,795 B2
(45) Date of Patent: Jun. 6, 2023

(54) RADAR SYSTEM

(71) Applicant: APTIV TECHNOLOGIES LIMITED, St. Michael (BB)

(72) Inventors: Armin Talai, Nuremberg (DE); Andrzej Samulak, Nuremberg (DE); Leonardi Roberto, Nuremberg (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 262 days.

(21) Appl. No.: 16/934,153

(22) Filed: Jul. 21, 2020

(65) Prior Publication Data
US 2021/0025971 A1 Jan. 28, 2021

(30) Foreign Application Priority Data
Jul. 25, 2019 (EP) .................................... 19188478

(51) Int. Cl.
| | |
|---|---|
| *G01S 7/40* | (2006.01) |
| *G01S 7/282* | (2006.01) |
| *G01S 13/00* | (2006.01) |
| *G01S 7/285* | (2006.01) |

(52) U.S. Cl.
CPC ............ *G01S 7/4008* (2013.01); *G01S 7/282* (2013.01); *G01S 13/003* (2013.01); *G01S 7/285* (2013.01)

(58) Field of Classification Search
CPC ...... G01S 7/4008; G01S 7/282; G01S 13/003; G01S 7/285
See application file for complete search history.

(56) References Cited

U.S. PATENT DOCUMENTS

| | | | |
|---|---|---|---|
| 4,980,696 A | 12/1990 | Stone et al. | |
| 5,990,835 A | 11/1999 | Kuntzsch et al. | |
| 6,830,221 B1* | 12/2004 | Janson | B64G 1/10 501/37 |
| 10,074,907 B2* | 9/2018 | Ding | H01Q 21/065 |
| 11,163,039 B2* | 11/2021 | Sakai | H01Q 15/08 |
| 2018/0132337 A1* | 5/2018 | Honda | H05B 47/115 |
| 2018/0159207 A1* | 6/2018 | Shurish | H01Q 1/421 |
| 2018/0233812 A1 | 8/2018 | Kim et al. | |

FOREIGN PATENT DOCUMENTS

| | | |
|---|---|---|
| JP | 6264316 B2 | 1/2018 |
| WO | WO-2019093022 A1 * | 5/2019 |

OTHER PUBLICATIONS

Extended European Search Report for Application No. 19188478.2 dated Oct. 29, 2019.

* cited by examiner

*Primary Examiner* — Peter M Bythrow
*Assistant Examiner* — Nazra Nur Waheed
(74) *Attorney, Agent, or Firm* — Carlson, Gaskey & Olds, P.C.

(57) ABSTRACT

A radar system includes a transmitting element adapted to transmit a radar signal, a receiving element adapted to receive a reflected signal of the radar signal being transmitted by the transmitting element, and a radome covering the transmitting element and the receiving element and having an inner surface and an outer surface. The inner surface of the radome faces the transmitting element and the receiving element. The radome comprises a recess being located at the inner surface.

19 Claims, 7 Drawing Sheets

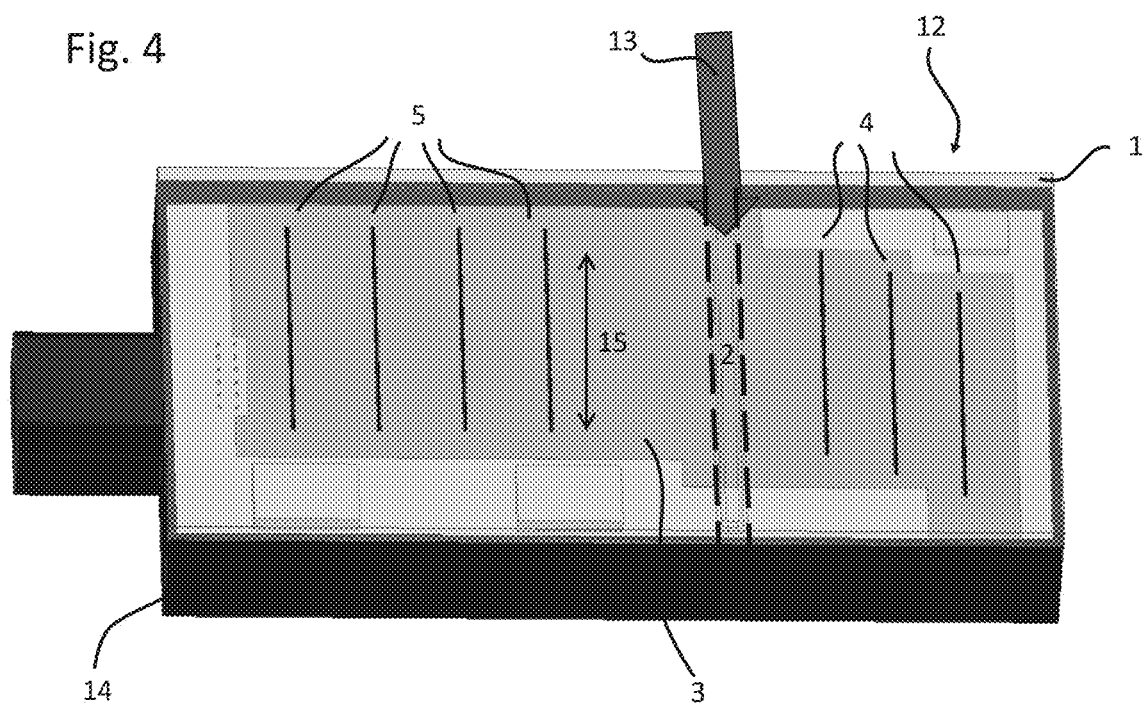

RADAR SYSTEM

FIELD

Figure 1A:
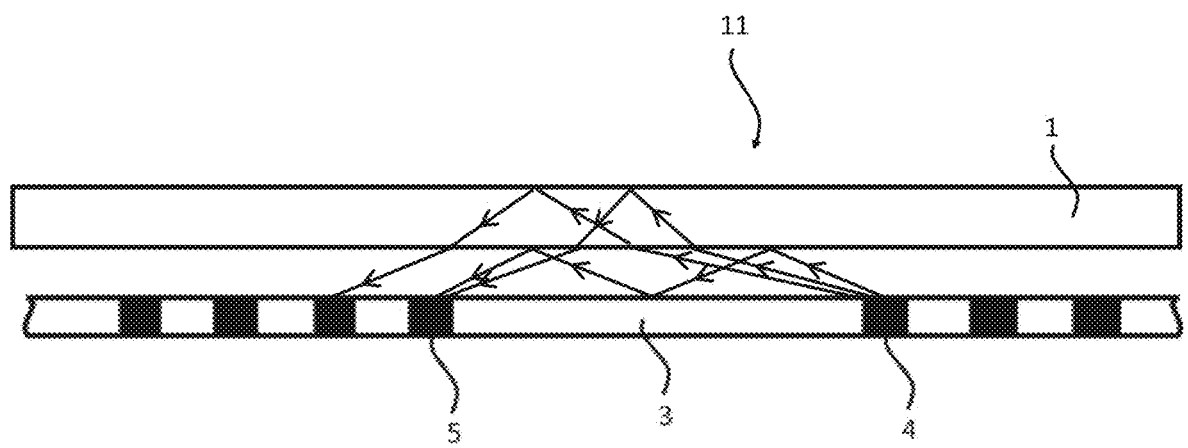

The present disclosure relates to a radar system comprising at least one transmitting element, at least one receiving element and a radome.

BACKGROUND

A radar system may comprise a device called radome which is located as a cover in front of antennas of the radar system in order to protect the antenna from the environment, i.e. as a protection against dust, moisture, etc. Usually, such a radome is a flat structure above an antenna of the radar system in order to maintain the same electrical length for transmission over incident angles for all antennas of the radar system.

However, the radome may lead to an undesired mutual coupling between transmitting antennas and receiving antennas of the radar system when the transmitting antennas or antenna arrays comprise a large irradiated angular range. Such an angular range may be e.g. 180° for substrate integrated waveguide antennas. This coupling is due to the energy originating from reflection at large incident angles on both sides of the radome and due to further multiple reflections at an antenna board on which the antennas of the radar system are located, as well as at the surfaces of the radome. The coupling between transmitting and receiving antennas of the radar system introduces additional noise for the signals of the receiving antenna and therefore reduces the performance of the radar system.

The undesired coupling between a transmitting path and a receiving path of a radar system may particularly be relevant for radar antenna arrays having a wide instrumental field of view in which detections are recorded, such as those used in automotive corner radar sensors. The reflectivity of a flat radome increases significantly for high incidence angles at which the corner radar sensors are transmitting due to their very large azimuthal radiation angular range. In order to reduce the additional noise level caused by the undesired coupling between transmitting and receiving antennas due to a radome, it has been proposed to include additional absorbers between the transmitting path and the receiving path. However, additional absorbers lead to higher cost of the radar system. Similarly, it has been proposed to implement equivalent band gap structures on an antenna printed circuit board between the transmitting path and the receiving path. However, such structures are sensitive to manufacturing tolerances which may increase scrap rates in mass production of radar systems.

On the other hand, the undesired coupling between a transmission path and a receiving path of the radar system could be reduced by increasing a horizontal distance between transmitting antennas and receiving antennas, e.g. on a printed circuit board. However, this would increase the entire dimensions of the radar system and therefore lead to additional cost.

The additional noise level caused by the radome may reduce the sensitivity and the range of a radar system. Due to a reduced sensitivity, weak targets like pedestrians or motorcycles may be erroneously detected at a reduced range by an automotive radar sensor.

Accordingly, there is a need to provide a radar system in which a noise level caused by a radome is reduced by low efforts and expenses.

SUMMARY

The present disclosure provides a radar system according to the independent claim. Embodiments are given in the subclaims, the description and the drawings.

In one aspect, the present disclosure is directed at a radar system comprising at least one transmitting element adapted to transmit a radar signal, at least one receiving element adapted to receive a reflected signal of the radar signal being transmitted by the transmitting element, and a radome covering the transmitting element and the receiving element and having an inner surface and an outer surface. The inner surface of the radome faces the transmitting element and the receiving element. The radome comprises a recess being located at the inner surface.

The radar system may comprise multiple arrays of transmitting elements and multiple arrays of receiving elements. In this case, the radome faces the multiple arrays of transmitting and receiving elements and may cover these entirely.

Due to the recess within the radome, a significant part of radiation which is caused by multiple scattering effects of the radiation of the transmitting element is redirected to predefined angular ranges where the energy of the radiation neither increases the noise level at the receiving elements nor disturbs the phase within the instrumented field of view of the radar system, i.e. of respective radar sensors comprised by the receiving element. In other words, a part of the energy which would propagate from the transmitting element to the receiving element if no recess were present within the radome is redirected by the recess and does therefore not reach the receiving element.

Therefore, the transmitting path and the receiving path of the radar system have a reduced coupling due to the recess. This leads to a reduced noise level of the reflected signal which is received by the receiving element. Consequently, the sensitivity of the radar system is improved due to the reduced noise level.

The radar system may further comprise one or more of the following features:

The transmitting element and the receiving element or multiple arrays of these elements may be located on a base plane, and the transmitting element and the receiving element may be positioned on a respective side of a plane extending perpendicular to the base plane and intersecting the recess of the radome. The transmission element may have a transmitting instrumented field of view into which the radar signal is transmitted and the receiving element may have a receiving instrumented field of view from which the reflected signal is received, and the recess of the radome may be located outside the instrumented transmitting field of view and outside the instrumented receiving field of view. The recess may have an optimized extension between the transmitting instrumented field of view and the receiving instrumented field of view.

Furthermore, the at least one transmitting element and the at least one receiving element may overlap when viewed in a first direction within the base plane. When viewed in a second direction being different from the first direction, the transmitting element and the receiving element may be separated by a predetermined distance, and the recess of the radome may be located within the predetermined distance above the transmitting element and the receiving element. The predetermined distance between the transmitting element and the receiving element may be sufficient in order to avoid a reflection of the radar signal within the instrumented field of view of the antennas or antenna arrays. The transmitting element and the receiving element may be located on a printed circuit board.

In addition, the radome may comprise a plate having at least two flat surfaces, and the recess of the radome may be located on one of the flat surfaces of the plate facing the transmitting element and the receiving element. A depth of the recess in a direction perpendicular to the flat surfaces of the plate may be not more than a half of a thickness of the plate in the same direction.

The recess may comprise surfaces being inclined with respect to the flat surfaces of the plate. A width of the recess in a direction along one of the flat surfaces may be maximized without contacting a respective field of view of the transmitting element and of the receiving element, i.e. the instrumented field of view of the antennas or antenna arrays. The radome may comprise a plurality of recesses. The radome may be produced by injection molding including the recess. Alternatively, the recess may be created by milling after producing the radome.

According to an embodiment, the transmitting element and the receiving element or multiple arrays of these elements may be located on a base plane and may be positioned on a respective side of a plane extending perpendicular to the base plane and intersecting the recess of the radome. In other words, the recess of the radome may be located between the transmitting element and the receiving element above a spatial gap between these elements. Due to this position of the recess of the radome, the blocking and redirecting property of the recess for multiply scattered radiation originating from the transmitting element is improved. Since the transmitting element and the receiving element are positioned on different sides of a plane intersecting the recess of the radome, the recess redirects radiation which would otherwise propagate almost directly from the transmitting element to the receiving element. Therefore, the energy of the radiation neither increases the noise level at the receiving elements nor disturbs the phase response within an instrumented field of view of the radar system.

The transmission element may have a transmitting instrumented field of view into which the radar signal is transmitted, and the receiving element may have a receiving instrumented field of view from which the reflected signal is received. The recess of the radome may be located outside the transmitting instrumented field of view and outside the receiving instrumented field of view. Due to this, the recess of the radome is not irradiated directly by the radar signal being transmitted by the transmitting element. Therefore, a direct transfer of energy from the transmitting element to the receiving element can be decreased due to the recess. Instead, the efficiency of the recess for reducing multiply scattered radiation reaching the receiving element is enhanced.

The recess may have an optimized extension between the transmitting instrumented field of view and the receiving instrumented field of view. Increasing the extension of the recess, e.g. a width parallel to the inner surface of the radome, may further improve the efficiency of the recess when reducing multiply scattered radar signals. However, the extension of the recess is to be restricted such that it does not reach the transmitting instrumented field of view or the receiving instrumented field of view in order to avoid distortion of the phase response within the instrumented field of view of the antennas or antenna arrays, i.e. of the transmitting element and the receiving element.

The at least one transmitting element and at least one the receiving element may overlap when viewed in a first direction within the base plane. By such an arrangement of the transmitting element and of the receiving element a compact radar system can be achieved which has reduced overall dimensions. When viewed in a second direction being different from the first direction, the transmitting element and the receiving element may be separated by a predetermined distance. The recess of the radome may be located within the predetermined distance above the transmitting element and the receiving element.

That is, the transmitting element and the receiving element may have a gap between those when viewed in the second direction which may be perpendicular to the first direction, whereas in the first direction an overlap between the transmitting and receiving elements is provided. Due to the location of the recess within the predetermined distance between the transmitting element and the receiving element, the recess decouples the transmitting element and the receiving element without the need of further separating elements like additional absorbers or band gap structures. Therefore, the recess of the radome has a high efficiency for decoupling the receiving element from the transmitting element in compact radar systems in which the transmitting element and the receiving element have an overlapping structure.

The predetermined distance between the transmitting element and the receiving element may be sufficient in order to avoid a direct reflection of the radar system within the recess in a direction toward the receiving element. Thus, a minimum distance between the transmitting element and the receiving element may be provided in order to prevent a direct coupling of the transmitting and receiving element. On the other hand, this minimum distance required for the decoupling is reduced by the recess of the radome in comparison to radar systems in which no such a recess of the radome is present.

The transmitting element and the receiving element may be located on a printed circuit board. By the printed circuit board, the base plane for the transmitting element and the receiving element may be uniquely defined. In addition, the printed circuit board may be a standardized and cheap device for accommodating the transmitting and receiving elements. Thus, the cost for the radar system may be reduced by including a standardized printed circuit board.

According to a further embodiment, the radome may comprise a plate having at least two flat surfaces, and the recess of the radome may be located on one of the flat surfaces of the plate facing the transmitting element and the receiving element. Such a radome having the shape of a flat plate may be easy to manufacture, and in addition the same electrical length may be provided for transmission over incident angles for all parts of the transmitting element.

A depth of the recess in a direction perpendicular to the flat surfaces of the plate may be not more than a half of a thickness of the plate in the same direction. Due to such a restriction of the depth of the recess, the stability of the plate forming the radome may be ensured. Generally, the depth of the recess may be a parameter for forming the radome wherein this parameter may be optimized, but may be limited by the required mechanical stability of the plate. Such an optimized depth may be approximately 50% of the thickness of the plate.

The recess may comprise surfaces being inclined with respect to the flat surfaces of the plate. A recess having inclined surfaces may be easier to produce than a corresponding recess having straight surfaces.

A width of the recess in a direction along one of the flat surfaces may be maximized without contacting a respective instrumented field of view of the transmitting element and of the receiving element. Thus, a compromise is achieved between the decoupling of the transmitting and receiving elements by increasing the width of the recess and between avoiding a direct irradiation of the recess by the transmitting element which would counteract the decoupling.

Furthermore, the radome may comprise the plurality of recesses. If the radome has more than one recess, the decoupling of the transmitting and receiving elements may be enhanced since a greater part of the energy caused by multiple scattering is blocked or redirected.

The radome may be produced by injection molding including the recess. That is, the recess may be included into a mold before the radome is produced. Due to this, the recess within the radome may be created with negligible additional effort. Alternatively, the recess may be created by milling after producing the radome. In this case, the radome of an existing radar system may additionally be provided with a recess in order to enhance the decoupling between the transmitting and receiving elements.

DRAWINGS

Figure 1B:
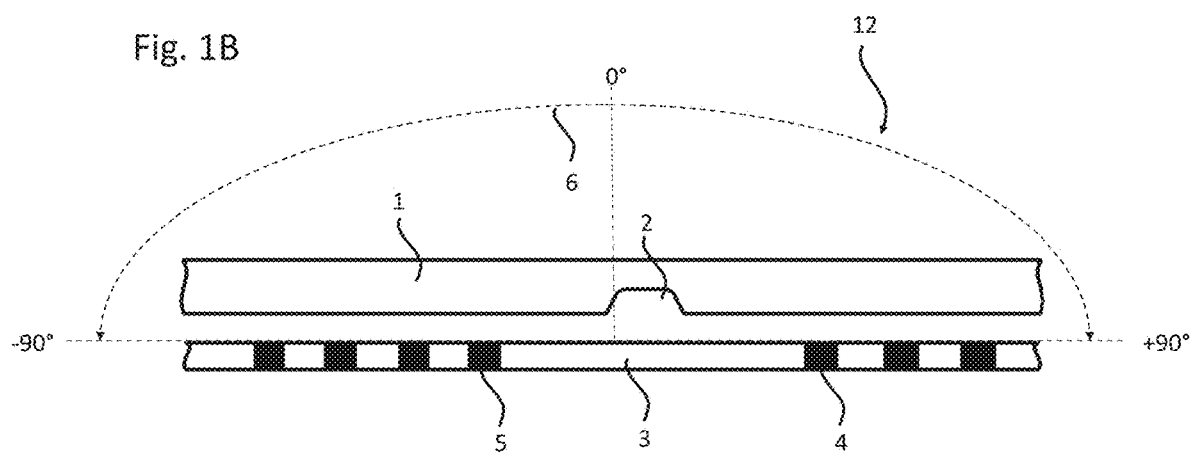
Figure 2:
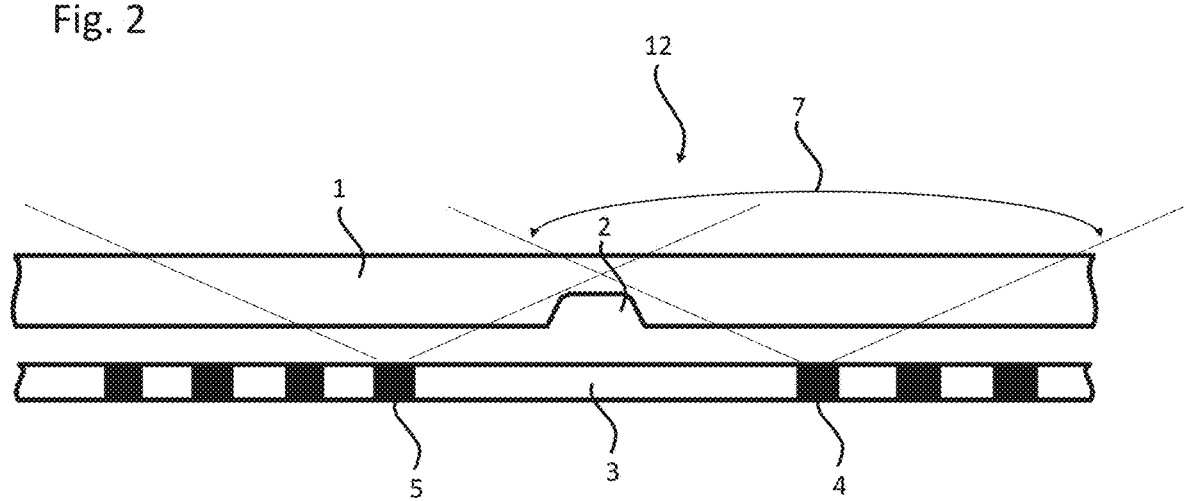
Figure 3:
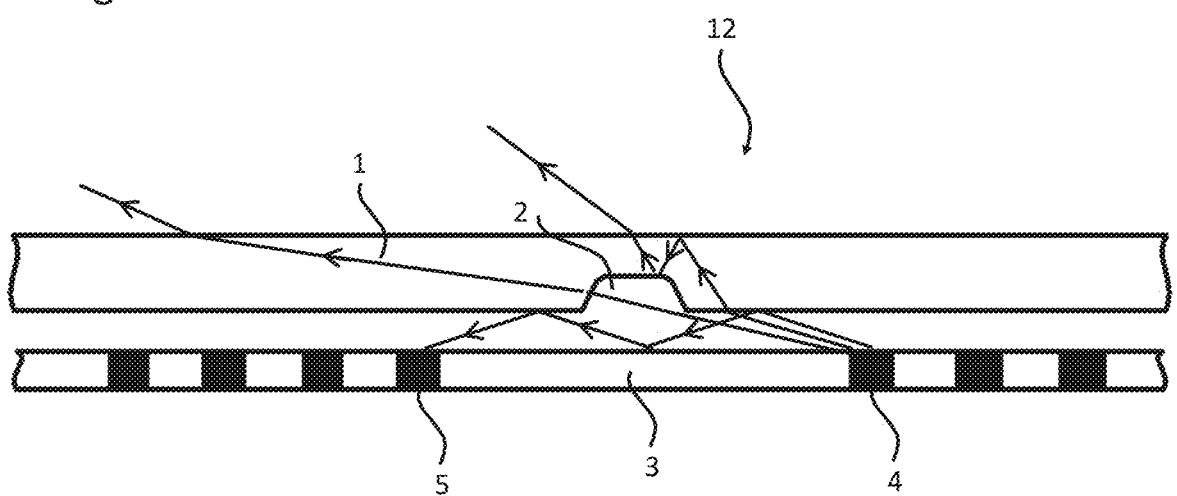
Figure 5A:
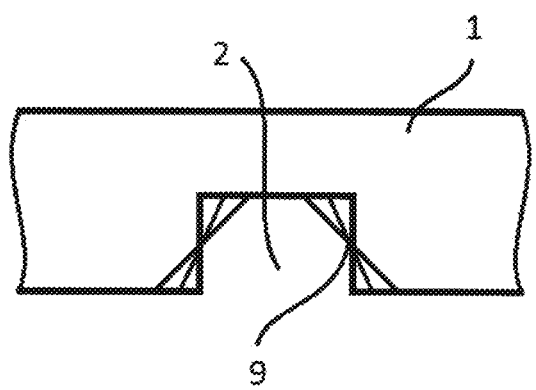
Figure 5B:
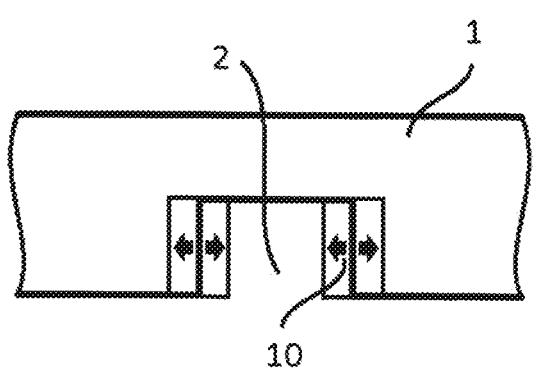
Figure 6:
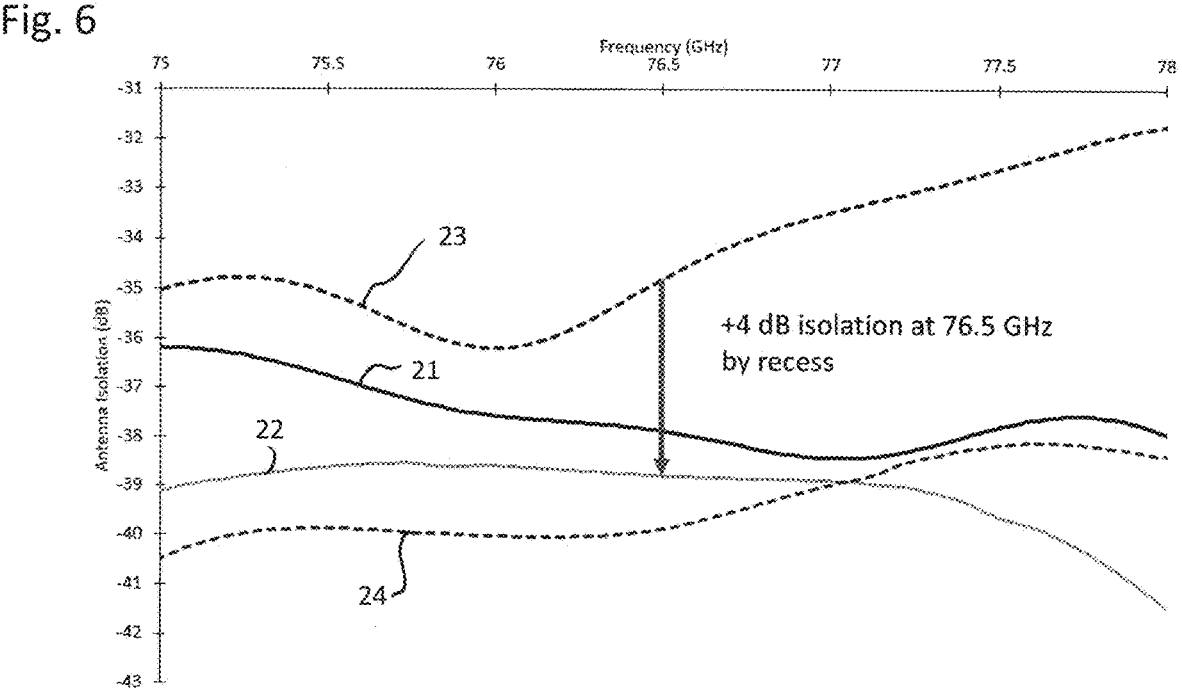

Exemplary embodiments and functions of the present disclosure are described herein in conjunction with the following drawings, showing schematically:

FIG. 1A depicts a simplified illustration of a radar system according to the background art, FIG. 1B depicts a simplified illustration of a radar system according to the disclosure, FIG. 2 depicts an instrumented field of view for the radar system as shown in FIG. 2, FIG. 3 illustrates the effect of decoupling transmitting and receiving elements for the radar system as shown in FIG. 2, FIG. 4 depicts a perspective view of a radar system according to the disclosure, FIGS. 5A and 5B illustrate variations regarding the geometry of a recess within a radome of the radar system according to the disclosure, and FIG. 6 depicts simulation results for the decoupling of transmitting and receiving elements.

DETAILED DESCRIPTION

FIG. 1A depicts a simplified illustration of a radar system 11 according to the background art. The radar system 11 comprises a radome 1 being a straight and flat plate made of plastic. The radar system 11 further comprises a printed circuit board 3 on which transmitting elements or a transmit antenna array 4 and receiving elements or a receive antenna array 5 are located. The radome 1 is located on top of the printed circuit board 3 in order to cover the transmit antenna array 4 and the receive antenna array 5 and to protect those with respect to the environment, e.g. against dust, moisture, etc.

The transmit antennas 4 transmit a radar signal, and a part of this radar signal may be multiply reflected at upper and lower surfaces of the radome 1 and additionally at the surface of the printed circuit board 3. Due to this, coupling paths (as indicated by arrows) between one of the transmit antennas 4 and some of the receive antennas 5 may be generated. Therefore, a part of the radar signal which is transmitted by the transmit antennas 4 may arrive at the receive antennas 5 without being scattered at a target object being located beyond the radome 1.

Due to the coupling paths between the transmit antennas 4 and the receive antennas 5, additional noise occurs in a reflected signal being detected by the receive antennas 5. The enhanced noise level of the reflected signals reduces the sensitivity of the radar system 11.

FIG. 1B depicts a simplified illustration of a radar system 12 according to the disclosure. The radar system 12 comprises the same elements as the radar system 11 depicted in FIG. 1A. In addition, the radome 1 comprises a recess or air cavity 2 which is located at an inner surface of the radome 1 facing the printed circuit board 3, the transmit antennas 4 and the receive antennas 5. The recess 2 is located at a position above a gap on the printed circuit board 3 in which no transmit antennas 4 and no receive antennas 5 are positioned. If the upper surface of the printed circuit board 3 is regarded as a base plane on which the transmit antennas 4 and the receive antennas 5 are located, the transmit antennas 4 and the receive antennas 5 are positioned on a respective side of a further plane extending perpendicular to the base plane, i.e. the printed circuit board 3, and intersecting the recess 2 of the radome 1.

As shown in FIG. 1B, the transmit antenna array 4 and the receive antenna array 5 each comprise an ultra-wide radiation angular range, e.g. from −90° to +90° with respect to a normal line (at 0°) to an upper surface of the printed circuit board 3. The transmit antenna array 4 and the receive antenna array 5 each include multiple substrate integrated waveguide antennas. An irradiated angular range 6 is depicted in FIG. 1B in order to illustrate the region into which the antennas of the radar system 11 radiate a significant amount of energy.

In addition, an instrumented field of view 7 is depicted in FIG. 2 for a transmit antenna 4 having the shortest distance with respect to the recess 2 of the radome 1. The boundaries of the instrumented field of view 7 are indicated by two lines starting from the transmit antenna 4. The instrumented field of view 7 covers a range from −75° to +75° with respect to the normal line (see FIG. 1B) to the upper surface of the printed circuit board 3. Furthermore, a corresponding instrumented field of view for the receive antennas 5 is illustrated by lines starting from a receive antenna 5 having the shortest distance with respect to the recess 2 of the radome 1. The instrumented field of view indicates a region or angle range in front of the antennas 4, 5 where objects can be detected by the radar system 11.

As shown in FIG. 2, the recess or air cavity 2 of the radome 1 is located outside the instrumented field of view 7 of the transmit antennas 4 and outside the corresponding instrumented field of view of the receive antennas 5. Due to this, a distortion of the phase response within the instrumented field of view 7 of the antenna arrays 4, 5 can be avoided, and less energy is transferred from the transmit antennas 4 and to the receive antennas 5 due to the recess 2 of the radome 1.

FIG. 3 illustrates the effect of the recess 2 within the radome 1 for the radar signals transmitted by the transmit antennas 4. A part of the radar signal transmitted by the transmit antennas 4 and being scattered multiple times is redirected by the surfaces of the recess 2 and does therefore not arrive at any of the receive antennas 5. Therefore, a part of the coupling paths as shown in FIG. 1A are transformed to a respective redirected path due to the recess 2 within the radome 1, as shown in FIG. 3. Therefore, the energy which is transferred by the coupling paths from the transmit antennas 4 to the receive antennas 5 is strongly reduced due to the redirected paths. Thus, the noise level of the reflected signal being detected by the receive antennas 5 is reduced due to the redirected paths being created by the recess 2 of the radome 1. Moreover, the sensitivity of the radar system 12 is improved due to the reduced noise level.

FIG. 4 depicts a perspective view of the radar system 12 according to the disclosure. The radar system 12 comprises the same elements as depicted in FIGS. 2 and 3, i.e. a radome 1 covering transmit antennas 4 and receive antennas 5 being located on a printed circuit board 3. An arrow 13 additionally indicates the position of the recess 2 being provided on an inner surface of the radome 1. The recess 2 extends parallel to the transmit and receive antennas 4, 5 between two longitudinal sides of a housing 14 of the radar system 12. In a direction perpendicular to the extension of the recess 2 within the radome 1 i.e. in a longitudinal direction of the radar system 12, the transmit antennas 4 and the receive antennas 5 overlap along a predetermined distance 15. Due to this overlap, the overall dimensions of the radar system 12 can be reduced. On the other hand, the transmit antennas 4 and the receive antennas 5 have a wide instrumented field of view which would provide coupling paths (see FIG. 1) if no recess 2 of the radome 1 were present. Instead, the recess 2 of the radome 1 decouples the receive antennas 5 from the transmit antenna 4 as illustrated in FIG. 3 without any need of further separation devices like additional absorbers or bandgap structures.

In FIG. 5A a portion of the radome 1 is depicted comprising the recess 2. Instead of having straight inner surfaces, i.e. side surfaces extending perpendicular to the inner surface of the radome 1, inclined side surfaces 9 are provided for the recess 2 wherein two different inclination angles are shown. Although it turned out that a variation of the inclination angle of the inclined side surfaces 9 has a low effect on electromagnetic radiation, i.e. on the coupling paths and on the redirected paths as shown in FIGS. 1 and 3, the manufacturing of the radome 1 may be simplified if inclined surfaces 9 are provided.

As indicated by arrows 10 in FIG. 5B, a width of the recess 2 in a direction parallel to the inner surface of the radome 1 may be varied. It turned out that the width of the recess 2 in a direction parallel to the inner surface of the radome 1 has a strong influence on the decoupling of the transmit antennas 4 and the receive antennas 5 (see FIGS. 2 and 3). The same holds true for the depth of the recess 2 in a direction perpendicular to the inner surface of the radome 1. Therefore, the width and the depth of the recess 2 is an important design parameter for the radome 1. It should be noted, however, that the extension of the width and the depth of the recess 2 within the radome 1 is restricted by the instrumented field of view 7 of the transmit antennas 4 and the receive antennas 5, as shown in FIG. 2. That is, the maximum width and maximum depth of the recess 2 within the radome 1 are limited such that a contact or overlap of the recess 2 with the instrumented fields of view 7 of the transmit antennas 4 and the receive antennas 5 is avoided.

FIG. 6 depicts simulation results for antenna decoupling or antenna isolation, i.e. for decoupling of the transmit antennas 4 and the receive antennas 5 as shown in FIG. 2. The antenna isolation in dB is depicted on the vertical axis, whereas the frequency in GHz is depicted on the horizontal axis. For this simulation, the strongest coupling paths between the transmit antennas 4 and the receive antennas 5 were considered only.

In detail, the full lines 21 and 22 represent the coupling paths between the second transmit antenna 4 (from the right side) in FIGS. 2 to 4 and the receive antenna 5 being closest to the transmit antennas 4, i.e. the fourth antenna of the system when starting from the right side. Furthermore, the dashed curves 23 and 24 show the antenna isolation for the third transmit antenna 4 (from the right side) and the closest receive antenna 5, i.e. for the antenna elements 4, 5 being closest to each other and closest to the recess 2 (see FIGS. 2 to 4). Furthermore, the lines 21 and 23 show simulation results for a radar system 11 according to the prior art as shown in FIG. 1 and having a radome 1 without the recess 2. In contrast, the lines 22 and 24 show simulation results for a radar system 12 according to the disclosure as shown in FIGS. 2 to 4 and comprising a radome 1 having the recess 2 for improving the decoupling between the transmit and receive antennas. As can be easily recognized from FIG. 6, the curves 21 and 23 for the radar system 11 comprising no recess 2 within the radome 1 show a weaker decoupling or isolation between the antennas for all frequencies than the curves 22, 24 for the radar system 12 having the recess 2 within the radome 1. At a frequency of 76.5 GHz being used for typical operation of the radar system 12 as shown in FIG. 4, an improvement of the isolation between the transmitting and receiving antennas of about 4 dB is achieved due to the presence of the recess 2 within the radome 1. In summary, the simulation results show that the recess 2 of the radome 1 is a cheap and effective measure to improve the decoupling or isolation of the transmit antennas 4 and the receive antennas 5.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A radar system comprising:
   at least one transmitting element adapted to transmit a radar signal,
   at least one receiving element adapted to receive a reflected signal of the radar signal that is transmitted by the transmitting element, and
   a radome covering the transmitting element and the receiving element, the radome having an inner surface that faces the transmitting element and the receiving element, the inner surface of the radome including a recess situated across from a space between the transmitting element and the receiving element,
   wherein
   the recess has a length parallel to the inner surface,
   the recess has a width parallel to the inner surface and perpendicular to the length,
   the width varies along the length,
   the transmitting element has a transmitting instrumented field of view into which the radar signal is transmitted,
   the receiving element has a receiving instrumented field of view from which the reflected signal is received, and
   the recess of the radome is located outside the transmitting instrumented field of view and outside the receiving instrumented field of view.

2. The radar system according to claim 1, wherein
   the transmitting element and the receiving element are located on a base plane, and
   the transmitting element and the receiving element are positioned on a respective side of a plane extending perpendicular to the base plane and intersecting the recess of the radome.

3. The radar system according to claim 1, wherein the recess has an optimized extension between the transmitting instrumented field of view and the receiving instrumented field of view.

4. The radar system according to claim 1, wherein the transmitting element and receiving element are respectively on a portion of a base plane and the transmitting element and the receiving element partially overlap when viewed in a first direction within the base plane.

5. The radar system according to claim 4, wherein
when viewed in a second direction being different from the first direction, the transmitting element and the receiving element are separated by a predetermined distance, and
the recess of the radome is located within the predetermined distance above the transmitting element and the receiving element.

6. The radar system according to claim 5, wherein the predetermined distance between the transmitting element and the receiving element is sufficient in order to avoid a direct reflection of the radar signal within the recess in a direction toward the receiving element.

7. The radar system according to claim 4, wherein the transmitting element and the receiving element are located on a printed circuit board.

8. The radar system according to claim 1, wherein:
the radome comprises a plate having at least two flat surfaces,
the recess of the radome is located on one of the flat surfaces of the plate facing the transmitting element and the receiving element.

9. The radar system according to claim 8, wherein a depth of the recess in a direction perpendicular to the flat surfaces of the plate is not more than half of a thickness of the plate in the same direction.

10. The radar system according to claim 8, wherein the recess comprises surfaces that are inclined with respect to the flat surfaces of the plate.

11. The radar system according to claim 8, wherein a width of the recess in a direction along one of the flat surfaces is maximized without protruding into a respective instrumented field of view of the transmitting element and of the receiving element.

12. The radar system according to claim 1, wherein the radome comprises a plurality of recesses.

13. The radar system according to claim 1, wherein the radome is produced by injection molding including the recess.

14. The radar system according to claim 1, wherein the recess is created by milling after producing the radome.

15. A radar system comprising:
a plurality of transmitting elements adapted to transmit a radar signal, each of the transmitting elements having an instrumented field of view;
a plurality of receiving elements adapted to receive a reflected signal of the radar signal that is transmitted by the transmitting elements; and
a radome covering the transmitting elements and the receiving elements, the radome having an inner surface that faces the transmitting elements and the receiving elements, the radome including a recess on the inner surface, the recess being situated across from a space between a first one of the transmitting elements and a first one of the receiving elements,
wherein
the first one of the transmitting elements is closer to the recess than any other transmitting element,
the plurality of transmitting elements collectively have a radiation angular range, and
the instrumented field of view of the first one of the transmitting elements has an angular range that is less than the radiation angular range, and
the recess is located outside the instrumented field of view of the first one of the transmitting elements and outside the instrumented field of view of the first one of the receiving elements.

16. The radar system according to claim 15, wherein the radiation angular range is from −90° to 90° and the angular range of the instrumented field of view of the first one of the transmitting elements is from −75° to 75°.

17. The radar system according to claim 15, wherein
the first one of the receiving elements is closer to the recess than any other receiving element,
the plurality of receiving elements collectively have a reception angular range, and
the instrumented field of view of the first one of the receiving elements has an angular range that is less than the reception angular range.

18. The radar system according to claim 15, wherein
the recess has a length parallel to the inner surface,
the recess has a width parallel to the inner surface and perpendicular to the length, and
the width varies along the length.

19. A radar system comprising:
at least one transmitting element adapted to transmit a radar signal,
at least one receiving element adapted to receive a reflected signal of the radar signal that is transmitted by the transmitting element, and
a radome covering the transmitting element and the receiving element, the radome having an inner surface that faces the transmitting element and the receiving element, the inner surface of the radome including a recess situated across from a space between the transmitting element and the receiving element,
wherein
the recess has a length parallel to the inner surface,
the recess has a width parallel to the inner surface and perpendicular to the length,
the width varies along the length,
the radome comprises a plate having at least two flat surfaces,
the recess of the radome is located on one of the flat surfaces of the plate facing the transmitting element and the receiving element, and
a width of the recess in a direction along one of the flat surfaces is maximized without protruding into a respective instrumented field of view of the transmitting element and of the receiving element.

* * * * *